(12) United States Patent
Mitsuyu

(10) Patent No.: US 7,668,434 B2
(45) Date of Patent: Feb. 23, 2010

(54) APPARATUS AND METHOD FOR REPLAYING DIGITAL DATA

(75) Inventor: Norihisa Mitsuyu, Tokyo (JP)

(73) Assignee: NEC Corporation, Tokyo (JP)

( * ) Notice: Subject to any disclaimer, the term of this patent is extended or adjusted under 35 U.S.C. 154(b) by 972 days.

(21) Appl. No.: 10/947,415

(22) Filed: Sep. 23, 2004

(65) Prior Publication Data

US 2005/0069283 A1 Mar. 31, 2005

(30) Foreign Application Priority Data

Sep. 25, 2003 (JP) ............................. 2003-334375

(51) Int. Cl.
*H04N 5/91* (2006.01)
(52) U.S. Cl. ...................................... 386/68
(58) Field of Classification Search ................ 386/68, 386/46, 111–112, 52, 105, 95
See application file for complete search history.

(56) References Cited

U.S. PATENT DOCUMENTS

| 5,307,086 A | * | 4/1994 | Griffin et al. | ................. | 715/808 |
| 6,574,422 B1 | * | 6/2003 | Kikuchi et al. | .............. | 386/105 |
| 6,847,778 B1 | * | 1/2005 | Vallone et al. | ................. | 386/68 |
| 7,031,596 B2 | * | 4/2006 | Sai et al. | ........................ | 386/95 |

FOREIGN PATENT DOCUMENTS

| JP | 2000-82048 | 3/2000 |
| JP | 2000-514264 | 10/2000 |
| JP | 2001-292402 | 10/2001 |
| JP | 2003-29911 | 1/2003 |

OTHER PUBLICATIONS

Japanese Office Action dated Jun. 25, 2007, with partial English-language translation.

* cited by examiner

*Primary Examiner*—Thai Tran
*Assistant Examiner*—Tat Chio
(74) *Attorney, Agent, or Firm*—McGinn IP Law Group, PLLC

(57) ABSTRACT

A digital data replaying apparatus is connected with a display unit, and includes an assisting section which generates a time bar data relating to a contents data in response to a time bar display instruction; and a replaying section which outputs the contents data and the time bar data to the display unit. A time bar is displayed on the display unit based on the time bar data and include a main section showing a replay time of the contents data; a current set of a plurality of segments provided to divide the time bar main section into a preset number; and a pointer icon which is displayed in association with one of the plurality of segments. The assisting section moves the pointer icon in association with the plurality of segments in response to a pointer movement instruction. When one of the plurality of segment is selected as a selection segment, the replaying section outputs the contents data to the display unit from a portion of the contents data corresponding to the selection segment as a replay contents data portion.

30 Claims, 10 Drawing Sheets

| REFERENCE TIME | ADDRESS | IMAGE DATA |
|---|---|---|
| 00:00:00:00 | | |
| 00:00:00:50 | | |
| 01:59:59:50 | | |
| 02:00:00:00 | | |

APPARATUS AND METHOD FOR REPLAYING DIGITAL DATA

BACKGROUND OF THE INVENTION

1. Field of the Invention

The present invention relates to a digital data replaying apparatus and a digital data replaying method.

2. Description of the Related Art

Digital AV apparatuses such as a digital video recorder and a digital video player are known. In the digital AV apparatus, video data is recorded and replayed on and from a DVD (digital Versatile Disc) and a HDD (Hard Disc Drive). The digital AV apparatus handles the video data as digital data by using a technique like MPEG. Thus, specification of a replay position such as a head search of the video data and scene jump is made possible with the high number of degrees of freedom. For control of the digital AV apparatus by a user, an infrared remote control unit is generally used. Thus, while viewing data displayed on a TV to which the digital AV equipment is connected, the user can control the digital AV apparatus.

In a typical method of specifying a replay position, an image like a time bar is displayed on the screen, and a cross button or stick of the remote control unit is operated to move a pointer icon showing a replay staring position. The pointer icon can be moved into left and right directions on a time bar smoothly through the operation of the cross button or the stick. Also, the pointer icon is moved in a comparatively low constant speed to make it possible to carry out a fine specification of a replay position.

However, the following problems exist in the above conventional method. First, in case a scene jump and a head search, it is requested to continue to push the cross button or stick needs until the pointer icon reaches a desired replay position. That is, the operability of the digital AV apparatus is remarkably lost. If the movement speed of the pointer icon is accelerated in accordance with a time period for which the cross button or stick is pushed, the required time could be reduced. However, it becomes difficult to stop the pointer icon on the replay position desired by the user. That is, the operability is rather compromised more. A method could be also considered in which a pointing device like a mouse or a trackball is used, as in a personal computer and a user instructs an optional position of the time bar. However, it is difficult to adopt the method in the digital AV apparatus instead of the remote control unit with respect to a limitation of the installation area of the pointing device and an installation environment, and the operability.

In conjunction with the above description, a digital video replaying method is disclosed in Japanese Laid Open Patent Application (JP-P2001-292402A). In this conventional example, a video image is replayed based on video contents and meta data. The video contents contain an event scene characterizing a scene of the video data, and the meta data contains an event data of the event scene itself and a start position of the event scene. By using the event data, the video data is replayed from an optional event scene desired by a user. Also, the meta data may contain a replay time data of the whole video data. In this case, a time bar corresponding to the replay time of the video data is displayed on a screen based on the replay time data through an operation by the user at the start of the replay of the video data or during the replay of the video data. Also, an icon for each of event scenes is displayed on the time bar. In this way, a replay start position desired by a user can be set simply and accurately through selection of one of the icons in this conventional example.

Also, a video data delivery system is disclosed in Japanese Laid Open Patent Application (JP-P2000-514264A, i.e., PCT/US97/11453). In this conventional example, a user can set an index on a picture from the start position of an event scene corresponding to a pointer icon selected by a user through the selection of the icon by the user. In this conventional example, the video data delivery system contains a media server and a subscriber device connected with the media server. A video stream is received from the media server and displayed on a display screen of the subscriber device. A graphical icon is displayed on the display screen of the subscriber device to point one of various positions on the video stream. The graphical icon can be used for the position adjustment of the video stream. When a change request of an output position of the video stream is instructed from the user, the subscriber device transmits the change request to the media server. The media server receives the change request from the subscriber device and determines a new output position of the video stream. The media server outputs the video stream from the newly determined position.

SUMMARY OF THE INVENTION

Therefore, an object of the present invention is to provide a digital data replaying apparatus and a digital data replaying method in which a replay start position can be instructed through a simple operation without loosing the number of degrees of freedom in specification of the replay start position of the contents.

Another object of the present invention is to provide a digital data replaying apparatus and a digital data replaying method in which a new replay start position can be specified in a short time.

In an aspect of the present invention, a digital data replaying apparatus is connected with a display unit, and includes an assisting section which generates a time bar data relating to a contents data in response to a time bar display instruction; and a replaying section which outputs the contents data and the time bar data to the display unit. A time bar is displayed on the display unit based on the time bar data and include a main section showing a replay time of the contents data; a current set of a plurality of segments provided to divide the time bar main section into a preset number; and a pointer icon which is displayed in association with one of the plurality of segments. The assisting section moves the pointer icon in association with the plurality of segments in response to a pointer movement instruction. When one of the plurality of segment is selected as a selection segment, the replaying section outputs the contents data to the display unit from a portion of the contents data corresponding to the selection segment as a replay contents data portion.

Here, the assisting section may generate a new time bar data in response to a segmentation change instruction such that the number of the segments is changed, and the time bar may be displayed on the display unit based on the new time bar data.

Also, the assisting section may generate the time bar data in response to the time bar display instruction such that the time bar further contains another set of a plurality of segments, and the number of the segments of the set is different from the number of segments of the other set.

Also, the assisting section may generate the time bar data in response to the time bar display instruction such that a small screen is displayed on the display unit to display the replay contents data portion. In this case, the assisting section may generate the time bar data such that the small screen is moved together with the pointer icon in response to the pointer movement instruction.

Also, the digital video contents data may be an MPEG video data stored in a storage media, and the MPEG video data may have a time data corresponding to each of a plurality of frames. The digital data replaying apparatus may further include a time table, which relates a system clock reference data contained in the MPEG video data as the time data and a storage position of the MPEG video data on the storage media. The assisting section may refer to the time table based on the system clock reference data related to the selection segment to determine the storage position as a start position of the replay contents data portion.

Also, the digital video contents data may be an MPEG video data stored in a storage media, and the MPEG video data may have a time data corresponding to each of a plurality of frames. The digital data replaying apparatus may further include a time table, which relates a system clock reference data contained in the MPEG video data, a small screen display portion of the MPEG video data corresponding to the system clock reference data and a storage position of the MPEG video data on the storage media. The assisting section may refer to the time table based on the system clock reference data related to the selection segment to determine the small screen display portion.

Also, the time bar display instruction and the pointer movement instruction may be outputted from a remote control unit.

Also, the contents data may contain a document data. When the contents data contains a document data, the digital data replaying apparatus may further include a content table, which relates a content display data showing items of contents of the document data and related with each of the plurality of segments and a content area data showing a range of the document data corresponding to the content display data. The assisting section may refer to the content table based on the selection segment in response to the pointer movement instruction to determine the content area data, and the replaying section outputs the document data corresponding to the determined content area data and the time bar data to the display unit.

Also, the contents data may contain a plurality of the continuous still video data.

In another aspect of the present invention, a digital data replaying method in a digital data replaying apparatus connected with a display unit, which the digital data replaying method is achieved by generating a time bar data relating to a contents data in response to a time bar display instruction; by displaying the time bar data and the contents data on the display unit from a start of the contents data, wherein a time bar is displayed on the display unit based on the time bar data and includes a main section showing a replay time of the contents data; a current set of a plurality of segments provided to divide the time bar main section into a preset number; and a pointer icon which is displayed in association with one of the plurality of segments, by moving the pointer icon in association with the plurality of segments in response to a pointer movement instruction. The displaying is achieved by when one of the plurality of segment is selected as a selection segment, displaying the contents data on the display unit from a portion of the contents data corresponding to the selection segment as a replay contents data portion.

The digital data replaying method may further include generating a new time bar data in response to a segmentation change instruction such that the number of the segments is changed, and displaying the new time bar data on the display unit.

Also, the generating a time bar data may be achieved by including the step of generating the time bar data in response to the time bar display instruction such that the time bar further contains another set of a plurality of segments, wherein the number of the segments of the set is different from the number of segments of the another set.

Also, the generating a time bar data may be achieved by including the step of generating the time bar data in response to the time bar display instruction such that a small screen is displayed on the display unit to display the replay contents data portion. In this case, the digital data replaying method may further include generating the time bar data such that the small screen is moved when the pointer icon is moved in response to the pointer movement instruction.

Also, when the digital video contents data is an MPEG video data stored in a storage media, and the MPEG video data has a time data corresponding to each of a plurality of frames, the displaying may be achieved by including the step of referring to a time table based on a system clock reference data related to the selection segment to determine a storage position as a start position of the replay contents data portion. The time table relates the system clock reference data contained in the MPEG video data as the time data and the storage position of the MPEG video data on the storage media.

Also, when the digital video contents data is an MPEG video data stored in a storage media, and the MPEG video data has a time data corresponding to each of a plurality of frames, the displaying may be achieved by including the step of referring to a time table based on a system clock reference data related to the selection segment to determine a small screen display portion. The time table relates the system clock reference data contained in the MPEG video data, the small screen display portion of the MPEG video data corresponding to the system clock reference data and the storage position of the MPEG video data on the storage media.

Also, the time bar display instruction and the pointer movement instruction may be outputted from a remote control unit.

Also, the contents data may contain a document data. In this case, the displaying may be achieved by including the step of referring to a content table based on the selection segment in response to the pointer movement instruction to determine a content area data. The content table relates the content display data showing items of contents of the document data and related with each of the plurality of segments and the content area data showing a range of the document data corresponding to the content display data.

Also, the contents data may contain a plurality of the continuous still video data.

In another aspect of the present invention, a computer-readable software product for achieving a digital data replaying method in a digital data replaying apparatus connected with a display unit.

DESCRIPTION OF THE PREFERRED EMBODIMENTS

Hereinafter, a digital data relaying apparatus of the present invention will be described in detail with reference to the attached drawings. It should be noted that a digital video data replaying apparatus will be described below mainly in as an example. However, the present invention is limited to it.

Figure 1:
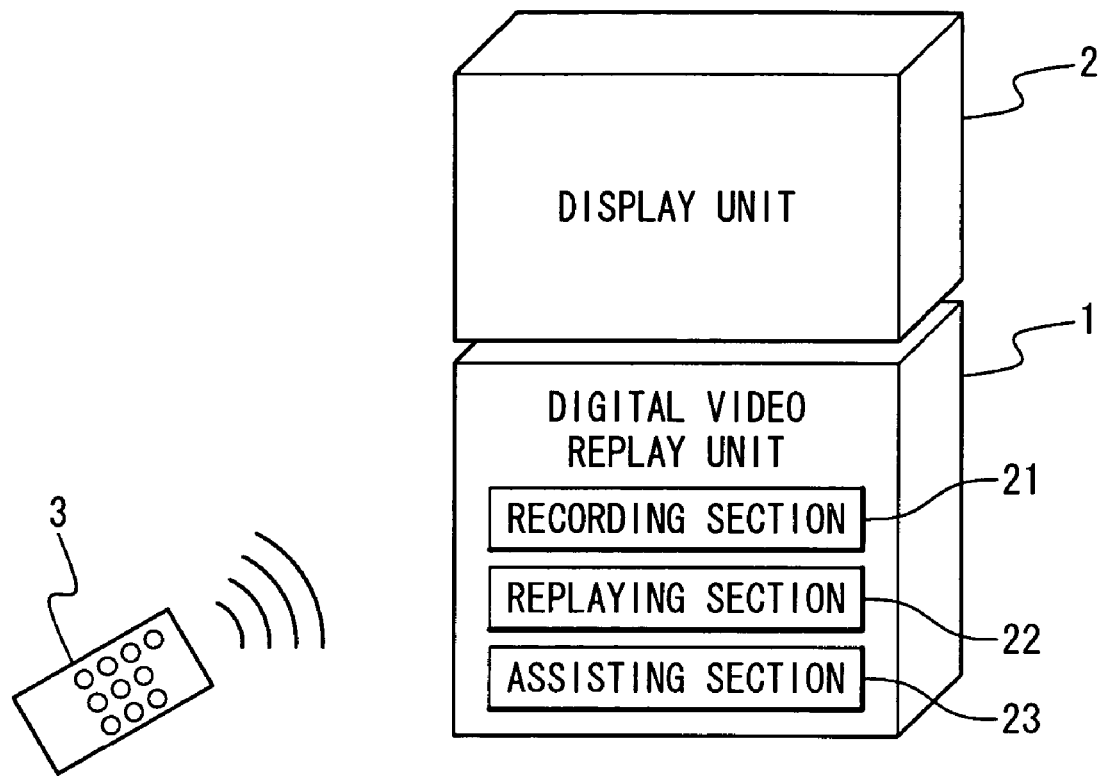
FIG. 1 is a block diagram showing the structure of a digital video replaying apparatus of a first embodiment of the present invention.

FIG. 1 is a block diagram showing the structure of the digital video replaying apparatus according to the first embodiment of the present invention. The digital video replaying apparatus 1 is a digital AV apparatus to replay a video data recorded on a HDD unit and a DVD unit. The operation of the digital video replaying apparatus 1 is controlled by a remote control 3. The digital video replaying apparatus 1 contains a recording section 21, a replaying section 22, and an assisting section 23 which are realized in software. The digital video replaying apparatus 1 is connected with a display unit 2 such as a plasma display monitor, a liquid crystal display, and a CRT display monitor, containing a television receiver. The video data outputted from the digital video replaying apparatus 1 is displayed on the display screen of the display unit 2.

The recording section 21 carries out a predetermined process for MPEG such as an image process and a speech process to a digital video data supplied from an external input terminal and then records the processed data on an HDD and a DVD set in a DVD drive section. Also, the recording section 21 carries out a predetermined process to data read out from the DVD and than stores it in the HDD. The replaying section 22 carries out predetermined processes such as an MPEG image process and the audio process to the video data recorded on the HDD or the DVD set in the DVD drive section and then outputs to the display unit 2 as a display video data. The assisting section 23 generates and outputs a time bar data to be described later to the replaying section 22 in response to an instruction from the remote control unit. The replaying section 22 outputs the display video data containing the time bar data to the display unit 2. The time bar data is displayed on the display screen of the display unit 2 as a time bar.

Figure 2:
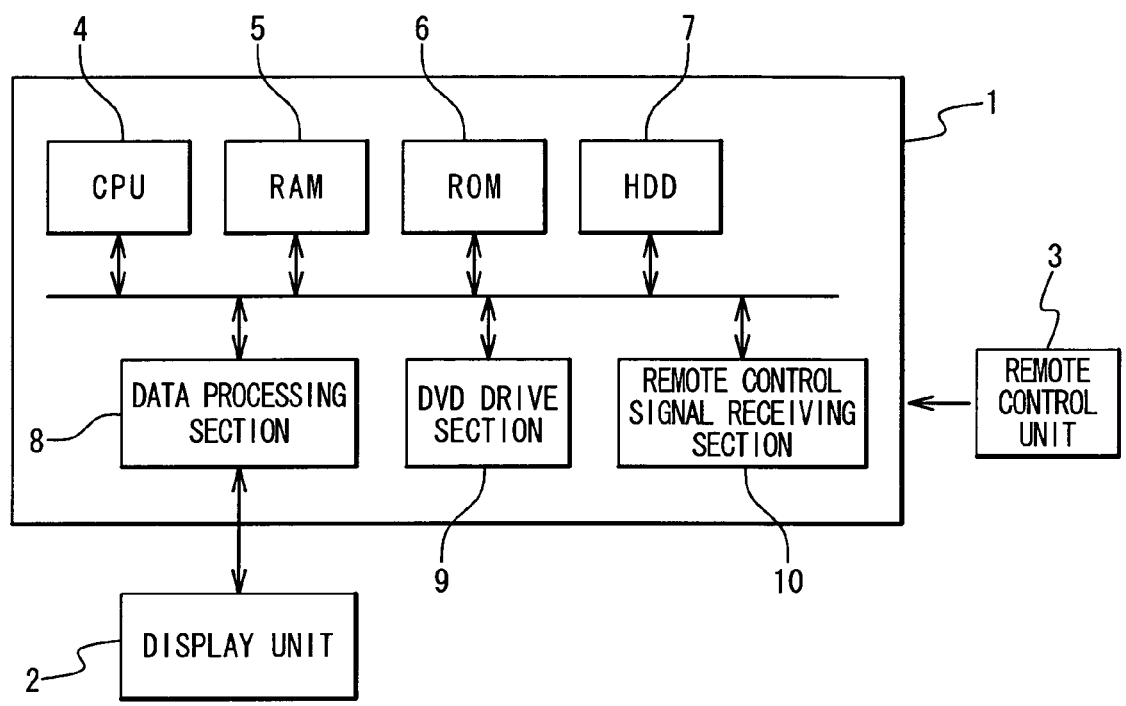
FIG. 2 is a diagram showing the system configuration of the digital video replaying apparatus according to the first embodiment of the present invention.

FIG. 2 is a diagram showing a system configuration of the digital video replaying apparatus according to the first embodiment of the present invention. The digital video replaying apparatus 1 is composed of a remote control unit 3, a CPU (Central Processing Unit) 4, a RAM (Random Access Memory) 5, a ROM (Read Only Memory) 6, a HDD (Hard Disk drive) 7, a data processing section 8, a DVD drive section 9, a remote control signal receiving section 10, which are connected with a bus. The recording section 21, the replaying section 22, and the assisting section 23 are realized in software stored in the HDD 7 by the CPU 4. The software is loaded in the RAM 5 when the digital video replaying apparatus 1 starts. Instead, the above software may be stored in the ROM 6. The CPU 4 controls the whole of digital video replaying apparatus 1 based on the software stored in the RAM 5 or the ROM 6. At that time, the CPU 4 controls the data processing section 8 to carry out the predetermined processes such as an image process and an audio process for MPEG to the video data. When recording the video data on the DVD or reading out the video data from the DVD, the CPU 4 drives the DVD drive section 9. The CPU 4 receives an instruction from the remote control unit 3 through the remote control signal receiving section 10, and carries out operations such as operation of the time bar, a recording operation and a replaying operation.

Figure 3:
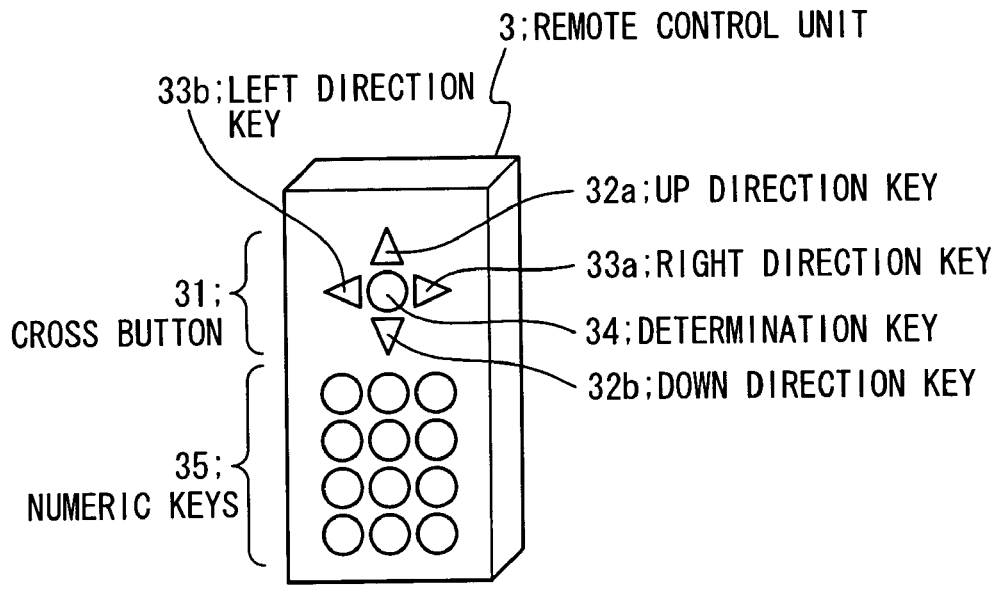
FIG. 3 is a diagram showing the outer appearance of a remote control unit.

FIG. 3 is a diagram showing the structure of the remote control unit 3. The remote control unit 3 is composed of a cross button 31, a determination key 34, and alphanumeric buttons 35. The cross button is a key to determine a direction, and has an up direction key 32a, a down direction key 32b, a right direction key 33a and a left direction key 33b. They are used to move a cursor and an icon displayed on the display unit 2 and to an upward direction, a downward direction, a right direction, and a left direction, respectively. The determination key 34 is used to determine the positions of the cursor and icon after the movement. The alphanumeric buttons are used to select a channel and a level such as a contrast level and a volume level. It should be noted that the remote control unit 3 is not limited to this shape, and is sufficient to have a small and light input section in which an input operation is easy.

Figure 4:
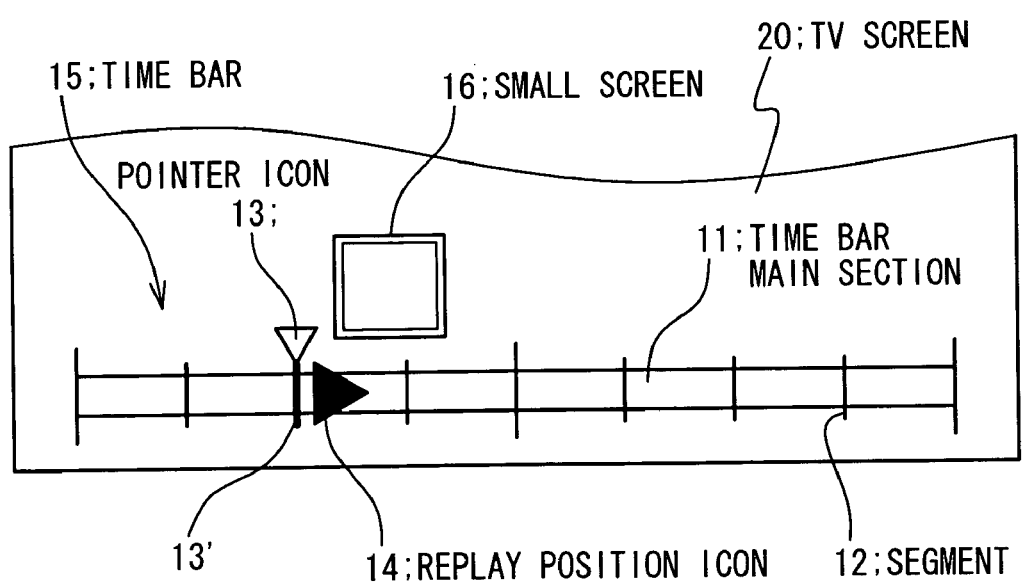
FIG. 4 is a diagram showing a time bar displayed on a display unit.

FIG. 4 is a diagram showing a time bar displayed on the screen of the display unit. The time bar data is generated by the assisting section 23 and is used to display the time bar. The time bar 15 contains a time bar main section 11, segments 12, a pointer icon 13 and a replay position icon 14. Moreover, a small screen 16 may be provided to display the video data at the replay position on the display screen 20 of the display unit 2. The time bar 15 has the following features.

(a) One of the ends of the time bar main section 11, e.g., the left end shows a start point of the video data being currently replayed and the other end thereof, e.g., the right end shows the end point of the video data. That is, the time bar main section 11 shows all the display time of the video data.

(b) The replay position icon 14 shows the replay position of the video data being currently replayed.

(c) The segments 12 are allocated to the time bar main section 11 in a same interval. The position of each of the segments 12 shows a replay time of the video data.

(d) The number of segments on the time bar main section 11 can be increased or decreased by the user operating the up direction key 32a or the down direction key 32b of the remote control unit.

(e) The pointer icon 13 is displayed on the time bar main section 11 to permit the user to specify a scene jump destination. The pointer icon 13 indicates an optional one of the segments 12 on the time bar main section 11.

(f) The pointer icon 13 can be jumped to a next segment when the user operates the left direction key 33b or the right direction key 33a in the remote control unit.

(g) The user can move the pointer icon 13 to an optional one of the segments 12, and specify the segment 12 by operating the determination button. Thus, the scene jump destination can be determined easily so that the video data corresponding to the segment 12 can be replayed.

(h) The small screen 16 displays the video data at the position of the pointer icon 13 to permit the user to confirm the contents.

The time bar is generated based on the time data contained in the video data. The time bar main section 11 shows a total replay time for replaying the whole of video data. For example, if the relay time of the video data is 120 minutes, the time bar main section 11 corresponds to the video data for 120 minutes from one end to the other end. The relay time of 120 minutes is determined based on the time data contained in the start portion of the video data and the time data contained in the last portion of the video data.

The replay position icon 14 indicates a position of the time bar main section 11 corresponding to a portion of the video data being currently replayed. In the above-mentioned example, if the portion of the video data being currently replayed is a position of 36 minutes from the start portion, the replay position icon 14 is displayed on the position of 3/10 from the right end of the time bar main section 11 based on the time bar main section 11 of 120 minutes and a current position of 36 minutes.

The segments 12 are displayed on the time bar main section 11 based on the preset number of divisions. The number of the division may be programmed in the assisting section 23 or may be rewritably stored in the HDD 7. In the above-mentioned example, when the number of divisions is 8, the seven segments 12 are displayed on the positions corresponding to 15 minutes, 30 minutes, 45 minutes, 60 minutes, 75 minutes, 90 minutes, and 105 minutes. In addition, the segments are displayed on the positions corresponding to 0 minute (left end) and 120 minutes (right end).

The pointer icon 13 is displayed on the position of one of the segments 12 which is the nearest replay position icon 14. In the above-mentioned example, when the number of divisions is 8 and the portion of the video data being currently replayed corresponds to a 36-minute position, the pointer icon 13 is displayed on the 2nd segment. Then, when the 4th segment is selected by the user through the remote control unit 3, a portion of the video data corresponding to the 60-minute position (=120*4/8) is selected based on the length of the time bar main section 11 (120 minutes), the number of segments 12 (eight), and the position of the segment 12 where the pointer icon 13 is displayed (4th segment). Thus, the pointer icon 13 is displayed based on the size of the video data. The pointer icon 13 is not limited to this form. A pointer icon 13' may be displayed by changing the color of the segment 12. In this case, an area of the screen hindered by the pointer icon 13' is less.

The small screen 16 is displayed in the neighborhood of the pointer icon 13 and is used to display the video data corresponding to the position of the pointer icon 13. The displayed video data may be one frame of the video data (a still image), and the video data of selected frames for a short time (3 seconds) corresponding to the position of the pointer icon 13. Thus, the video data in the frame jump destination can be simply confirmed.

Figure 5:
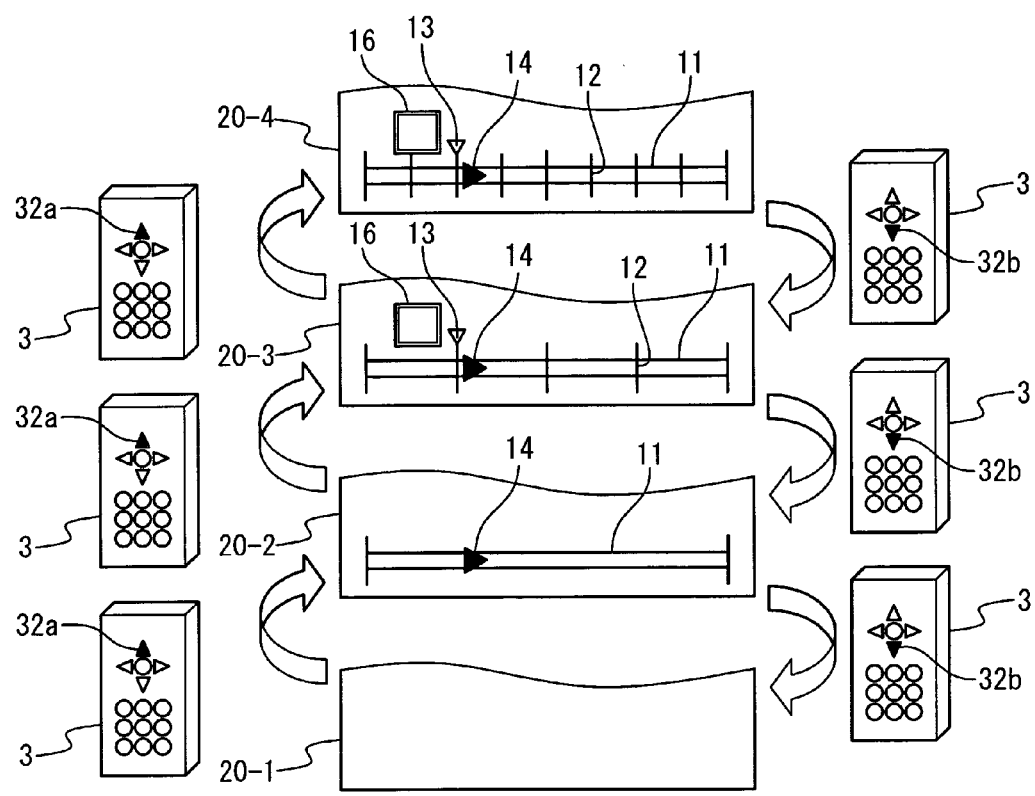
FIG. 5 is a diagram showing an operation of changing the number of segments on the time bar displayed on the display unit.

FIG. 5 is a diagram showing the operation of the number of divisions of the time bar displayed on the screen of the display unit. A state that the video data is replayed on the display screen 20-1, but the time bar is not displayed is shown in the bottom potion of FIG. 5. When the user operates the up direction key 32a of the remote control unit 3, the time bar is displayed on the screen 20-2, as shown in the second portion from the bottom portion. In this state, only the time bar main section 11 and the replay position icon 14 are displayed and the segments 12 and the pointer icon 13 are not displayed.

Next, when the up direction key 32a of the remote control unit 3 is operated once again, the segments 12 and the pointer icon 13 are displayed on the screen 20-3 in addition to the time bar main section 11 and the replay position icon 14, as shown in the third portion from the bottom portion. In this case, the segments 12 are displayed such that the time bar main section 11 is divided into four. The pointer icon 13 is displayed on the position on one of the segments 12 which is the nearest from the replay position icon 14. At this time, if the display of the small screen 16 is set, the small screen 16 is displayed at the same time in the neighborhood of pointer icon 13.

Next, when the up direction key 32a of the remote control unit 3 is operated once again, the segments 12 when the time bar main section 11 is divided into eight are displayed on the screen 20-4 as shown in the top portion of FIG. 5. In this way, if the segments 12 when the time bar is divided into 32 as a maximum are prepared, the number of divisions can be changed in such a manner of "no division→4 divisions→8 divisions→16 divisions→32 visions" by operating the up direction key 32a. On the contrary, the number of divisions can be changed in such a manner of "32 divisions→16 divisions→8 divisions→4 divisions→no division" by operating the down direction key 32b.

The determination of the number of divisions is carried out by operating the determination key 34. When the number of divisions should be changed again after the determination, the up direction key 32a and the down direction key 32b may be operated again.

Figure 6:
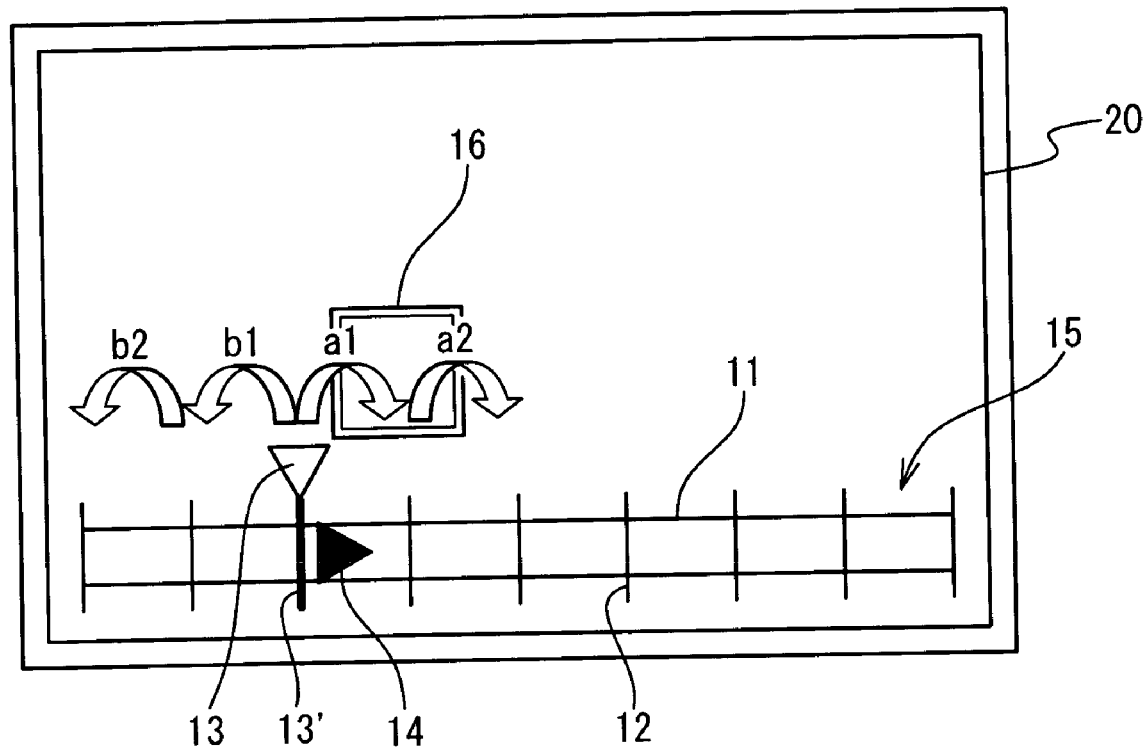
FIG. 6 is a diagram showing a scene jump operation on the time bar displayed on the display unit.

FIG. 6 is a diagram showing a scene jump operation on the time bar displayed on the screen 20 of the display unit. Here, the time bar that the number of the divisions is 8 is displayed on the display screen 20.

When the user operates the right direction key 33a of the remote control unit 3 once, the pointer icon 13 jumps or moves onto the segment 12 on the right side from the current segment 12, as shown in FIG. 6 by a1. Moreover, when the right direction key 33a is operated once again, the pointer icon 13 jumps or moves on the segment 12 on the right side from the current segment 12, as shown in FIG. 6 by a2. Similarly, when the user operates the left direction key 33b of the remote control unit once, the pointer icon 13 jumps or moves onto the segment 12 on left side from the current position, as shown in FIG. 6 by b1. Moreover, when the left direction key 33b is operated once again, the pointer icon 13 jumps or moves onto the segment 12 on the left side, as shown in FIG. 6 by b2. At this time, although being not shown, the small screen 16 may be moved at the same time. Instead, the small screen 16 may be not moved and the display of the small screen 16 may be changed in accordance with the position of the pointer icon 13.

The pointer icon cannot be moved to a position where there is no segment 12. The position of the pointer icon 13 is determined by operating the determination key 34. Thus, the portion of the video data being currently replayed jumps to another portion thereof pointed out by the pointer icon 13 and the replay of the video data is restarted from the pointed portion.

Figure 7:
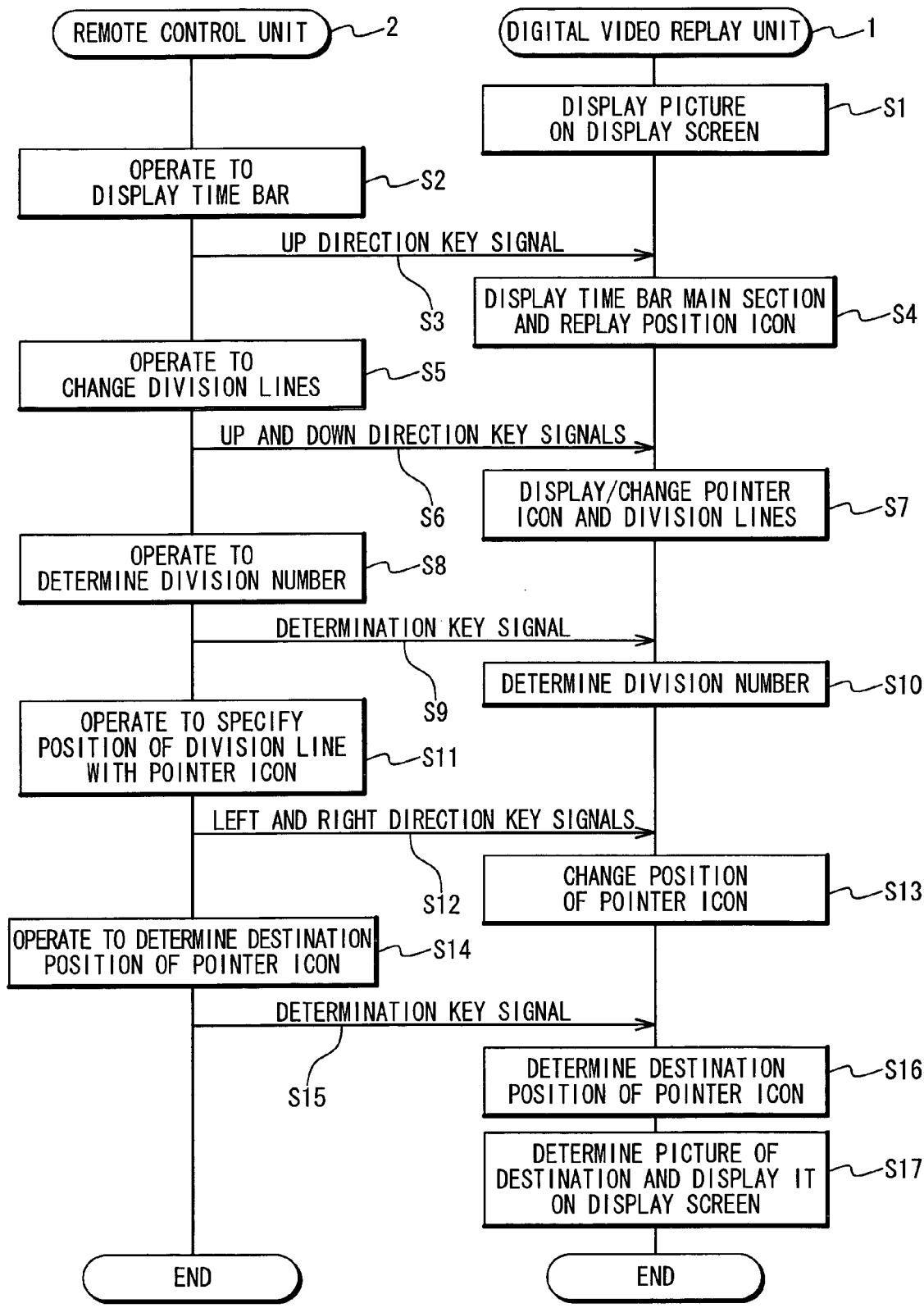
FIG. 7 is a sequence chart showing the operation of the digital video replaying apparatus according to the first embodiment of the present invention.

Next, an operation of the digital video replaying apparatus to which the digital data replaying apparatus according to the first embodiment of the present invention is applied will described. FIG. 7 is a flow chart showing the operation of the digital video replaying apparatus according to the embodiment of the present invention.

(1) Step S1: The user operates the replaying section 22 of the digital video replaying apparatus 1 directly or through the remote control unit 3 to display video data on the display screen 20 of the display unit 2.

(2) Step S2: The remote control unit 3 receives an instruction from the user to display a time bar. For example, this is accomplished by the operation of the up direction key 32a.

(3) Step S3: The remote control unit 3 outputs an up direction key signal to the digital video replaying apparatus 1.

(4) Step S4: The assisting section 23 of the digital video replaying apparatus 1 forms the time bar main section 11 based on the time data contained in the start portion of the video data and the last portion of the video data. At the same time, the time data of the video data being currently replaying is referred to and the current position icon 14 to indicate the position of the video data being currently replayed. Then, the replaying section 22 displays the video data on the display screen 20 including the time bar main section 11 and the current position icon 14.

(5) Step S5: The remote control unit 3 receives the operation of display/change of the number 12 of the divisions by the user. For example, this is accomplished by the operation of the up direction key 32a/down direction key 32b key.

(6) Step S6: The remote control unit 3 outputs an up direction key signal/down direction key signal to the digital video replaying apparatus 1.

(7) Step S7: The assisting section 23 of the digital video replaying apparatus 1 reads the previously set number of the divisions (refer to FIG. 5) in accordance with the up direction key signal/down direction key signal, and generates the segments 12 based on the time bar main section 11. At the same time, the assisting section 23 generates the pointer icon 13 on the position of the segment 12 which is the nearest the position of the video data being currently replayed. Then, the replaying section 22 displays the video data on the display screen 20 including segments 12, the pointer icon 13, the time bar main section 11 and the current position icon 14. The steps S5 to S7 are repeated based on the operation of the user.

(8) Step S8: The remote control unit 3 receives the operation by the user to determine the number of the divisions. For example, this is accomplished by the operation of the determination key 34.

(9) Step S9: The remote control unit 3 outputs a determination key signal to the digital video replaying apparatus 1.

(10) Step S10: The assisting section 23 determines the number of the divisions and fixes the segments 12. The replaying section 22 displays the video data on the display screen 20 including the fixed segments 12, the pointer icon 13, the time bar main section 11 and the current position icon 14.

(11) Step S11: The remote control unit 3 receives the operation to specify a destination position to which the pointer icon should be moved, i.e., a scene jump destination position by the user. For example, this is accomplished by the operation of the right direction key 33a/left direction key 33b.

(12) Step S12: The remote control unit 3 outputs a right direction key signal/left direction key signal to the digital video replaying apparatus 1.

(13) Step S13: The assisting section 23 changes the position of the pointer icon 23. The replaying section 22 displays the video data on the display screen 20 including the changed pointer icon 13, the segments 12, the time bar main section 11 and the current position icon 14. The steps S11 to S13 are repeated based on the operation of the user.

(14) Step S14: The remote control unit 3 receives the operation to determine the position of the pointer icon 23 by the user. For example, this is accomplished the operation of determination key 34.

(15) Step S15: The remote control unit 3 outputs a determination key signal to the digital video replaying apparatus 1.

(16) Step S16: The assisting section 23 determines the scene jump destination position through the determination of the position of the pointer icon 23. That is, the assisting section 23 determines time data as the scene jump destination position based on the position of the segment 12 corresponding to the pointer icon 23, the number of segments 12 and the time length of the time bar main section 11.

(17) Step S17: The replaying section 23 determines the position corresponding to time data as the scene jump destination position. Then, the video data is replayed on the display screen 20 from the portion corresponding to the position.

In case of the MPEG video data, when the replay position does not correspond to the position of a system (program) clock reference, there is a case that the displayed video data disorders for a short time (within 0.5 seconds). To cope with it, the following timetable is generates before the video data is replayed.

Figures 8, 9:
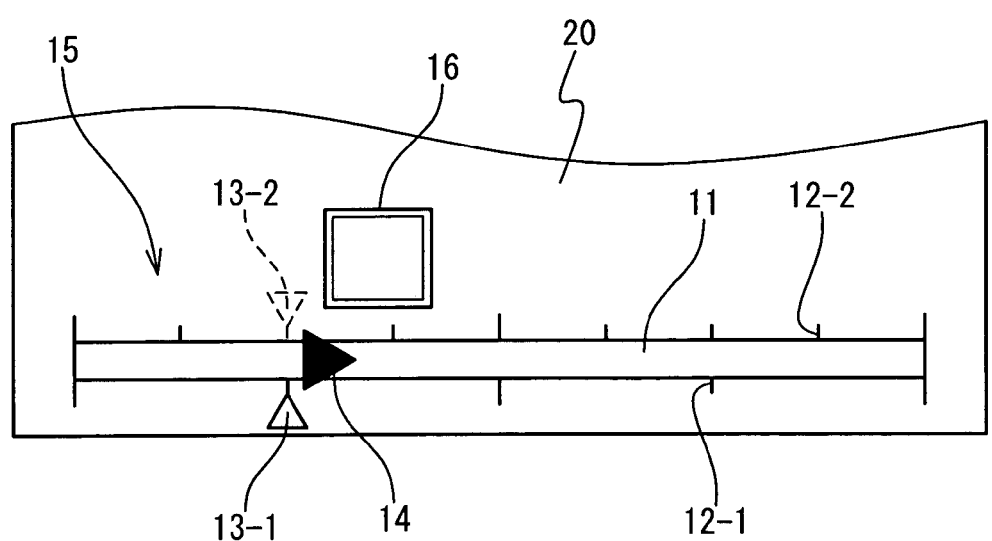
FIG. 8 is a diagram showing a timetable.
FIG. 9 is a diagram showing another example of the time bar displayed on the display unit.

FIG. 8 is a diagram showing an example of the timetable. The timetable 40 relates a reference time 41, an address 42 and video data 43. Here, the reference time 41 indicates the above-mentioned time data and is the system (program) clock reference in MPEG data. The reference time 41 does not exist in all the frames of the video data and is allocated for each of frames, a time between which is equal to or less than about 0.5 seconds. In this example, it is shown in time: minute: second: 1/100 seconds. The address 42 indicates a position of the HDD and DVD in which the video data corresponding to the reference time 42 is stored. The video data 43 is image data for one frame on the position of the video data to be replayed corresponding to the reference time 41. The video data may be the video data of about several seconds, containing the video data in which some frames are removed.

In case of the step S1 of the above-mentioned operation, the video data is scanned immediately before the video data is replayed, and a table shown in FIG. 8 is generated and stored in the RAM 5. Then, at the step S13, first, the reference time 41 corresponding to the position of the pointer icon 13 is calculated in accordance with the operation of the pointer icon 13. Next, the video data 43 corresponding to the reference time 41 is taken out from the timetable 40. Then, the video data 43 is outputted together with the time bar data. Thus, the small screen 16 can be displayed in the neighborhood of the time bar 15. In addition, the reference time 41 of FIG. 8 is used as the time data to determine a scene jump destination position at a step S17. After the position of the time data is determined from the reference time 41, the video data is replayed on the display screen 20 from the position of the corresponding address 42. For example, in case of FIG. 8, when the position of the scene jump destination position is 3/8, the segment which is the nearest to 00:45:00:00 (=(02:00:00:00-00:00:00:00)×3/8) is selected as the reference time 41, and the scene jump destination position becomes the corresponding address 42.

FIG. 9 is a diagram showing another example of the time bar displayed on the screen of the display unit. The time bar data generated by the assisting section 23 is used to display the time bar shown in FIG. 9. The time bar contains the time bar main section 11, a segment 12-1 and a segment 12-2, the pointer icon 13-1 (or 13-2) and the replay position icon 14. In this case, this example is different from the example shown in FIG. 4 in the point that the segments 12 of the different kinds are displayed on the upper and down sides of the time bar main section 11. That is, when the up direction key 32a is operated, the time bar main section 11, the four segment 12-1 and the eight segments 12-2, the pointer icon 13-1 and the replay position icon 14 are displayed, containing the small screen 16 in accordance with the operation. When a left or right direction key is operate, the pointer icon 13-1 is moved on the four segments 12-1. Thus, a scene jump destination position can be specified. Moreover, if the up direction key 32a is operated, the pointer icon 13-1 passes away and the pointer icon 13-2 is displayed. Then, the pointer icon 13-2 is moved on the eight segments 12-2. Thus, a scene jump destination position can be specified. Moreover, if the up direction key 32a is operated, it is possible to increase the number of segments 12-1 and the number of segments 12-2 to eight and sixteen. In this way, the segments of a plurality of kinds can be displayed at once on the time bar. Also, the display position of the time bar is not limited to the underside of display screen 20 and may be displayed in an optional position on the display screen 20.

According to the present invention, it is possible to specify the scene jump destination position at high speed. In the conventional method of specifying the scene jump destination position, because the pointer icon moves slowly, it necessary to continue to push a button of the remote control unit for a long time until the icon reaches the scene jump destination position. In the method of the present invention, because the pointer icon can be moved in units of segments, the quick specification of the jump position becomes possible.

Also, according to the present invention, the speed to specify the scene jump destination position can be made variable. In the conventional method, it is possible only to move the pointer icon at a constant speed or a speed accelerated gradually in accordance with the operation time period, although the user cannot specify the speed. In the method of the present invention, because the user can optionally change the number of the divisions, it is possible to measure the different needs of the user, e.g., coarse movement or fine movement of the pointer icon.

Also, according to the present invention, the specification precision of the scene jump destination position can be made variable. In the present invention, only one of the segments is specified as the scene jump destination position. It is possible to coarsely specify the destination position by dividing the time bar coarsely and to finely specify it by dividing the time bar finely.

In the present invention, the calculation process of the scene jump destination position is reduced. In the conventional method of specifying the scene jump destination position, after a position of the pointer icon is determined by the user, the process of calculating a video data relay position and time data is necessary. However, in the method of the present invention, because the position instructed by the pointer icon is determined based on the segment, the scene jump destination position can be calculated previously. Also, because the calculation is very simple and is easy, it is possible to reduce the process after the jump destination position is determined.

In the present invention, the process of rewriting a screen display in case of the movement of the pointer icon can be reduced. In the conventional method of specifying the jump destination, because the pointer icon moves slowly and smoothly on the time bar to the jump destination, the redrawing of the pointer icon occurs frequently. Therefore, the number of times of rewrite of the screen display very increases. On the other hand, in the method of the present invention, because the pointer icon specifies one of the segments, the pointer icon needs not to smoothly and slowly on the time bar. Therefore, the number of times of rewrite of the screen display decreases and a process is reduced.

According to the present invention, the small screen 16 can be displayed in the neighborhood of the time bar 15. Thus, the video data in the scene jump destination position can be confirmed and the user can find a desired scene jump destination position more surely. In addition, the video data for the small screen 16 is previously stored, and the display on the small screen 16 can be carried out at very high speed.

Figure 10A:
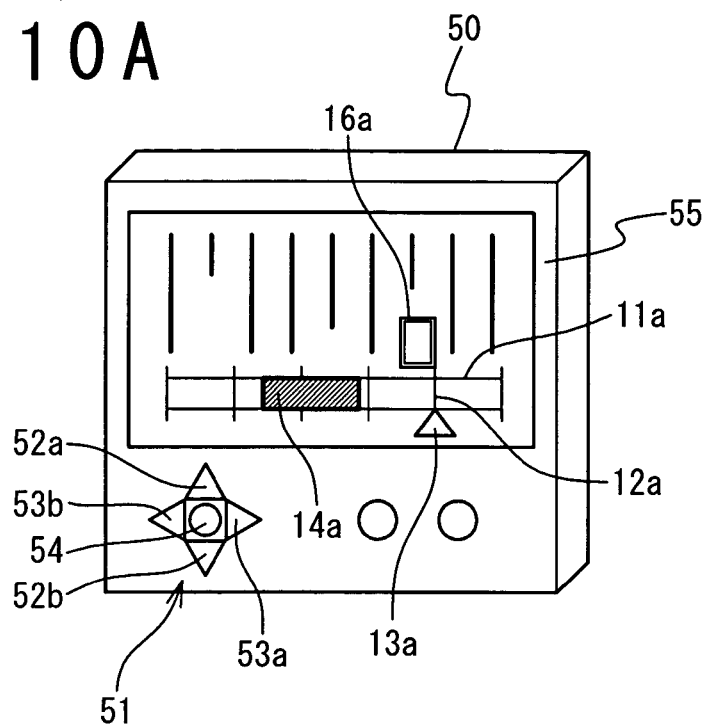
FIG. 10A is a diagram showing a document reader of a lateral scroll type with the time bar display.

The above-mentioned time bar can be applied in various cases in addition to the case to replay a video data. FIG. 10A is a diagram showing a document reader of a lateral scroll type with a time bar. The document reader displays a document in the form of electronic data on the display screen. The document reader is a carrying type information terminal such as a PDA (Personal digital Assistant) and an electronic reader of exclusive use.

The document reader 50 displays the time bar main section 11a, the segments 12a, the pointer icon 13a, the relay position icon 14a, and the small screen 16a on display screen 55. The document reader 50 is operated through the operation of a cross button 51 (an up direction key 52a, a down direction key 52b, a right direction key 53a, a left direction key 53b, and a determination key 54). The pointer icon 13a moves while jumping on the segments 12a by the operation of the cross button 51. A sentence from the head of the sentence in the jump destination position or an item of the contents is displayed on the small screen 16a. For example, recognition of the jump destination and the display data is carried out by referring to the position table 45 shown in FIG. 13.

Figure 13:
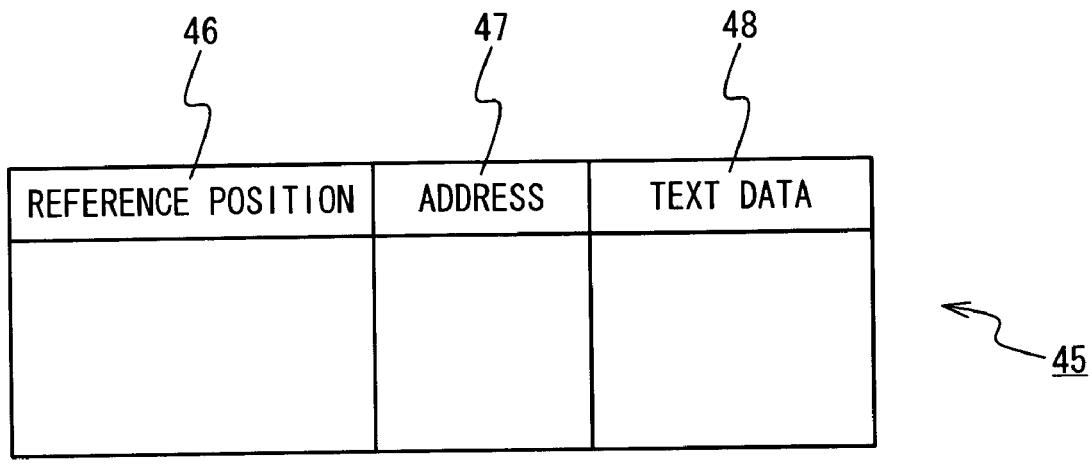
FIG. 13 is a diagram showing a position table.

FIG. 13 is a table showing an example of the position table. The position table 45 relates a reference position 46, an address 47 and text data 48. Here, the reference position 46 indicates a page of the document of the electronic data. Here, the reference position is provided every page as if it shows a page number. The address 47 shows a position on the HDD and the memory in which the electronic data corresponding to the reference position 46 is stored. The text data 48 is the first sentence of the reference position 46 in the document of the electronic data to be replayed or the item of the contents at the corresponding part. For example, because the small screen 16a is small, one sentence or the item of the contents are displayed on the small screen 16a, in display of only the leading 10 letters or in the form of compacted hiragana and Katakana letters.

The above-mentioned operation can be applied to the document reader as well as the digital video replaying apparatus. In case of the step S1 of the above-mentioned operation, the document of the electronic data is scanned immediately before relaying the document of the electronic data, and a table shown in FIG. 13 is produced and stored in the RAM 5 previously. Then, at the step S13, first, the reference position 46 corresponding to the position of the pointer icon 13 is calculated in accordance with the operation of the pointer icon 13. Next, the text data 48 corresponding to the reference position 46 is taken out from the position table 45. Then, the text data 48 is outputted together with the time bar data. In this way, the time bar can be displayed on the small screen 16a. When the letters of this passage hides behind the small screen 16a, the replaying section 22 displays the small screen by shifting the small screen position so as for the letters not to be hidden. Then, at the step S16, after the determining of the destination position, the small screen and the time bar 15a are deleted from the screen. The operation is same as in the above example except for use of the position table 45, and therefore the description is omitted.

It should be noted that the deletion of the time bar 15*a* and the small screen 16*a* is carried out based on the setting by the user. A setting is possible in which one of the time bar 15*a* and the small screen 16*a* is deleted, or the time bar 15*a* and the small screen 16*a* are deleted in response to a delete instruction. The setting is stored in the memory.

In the present invention, the small screen 16*a* can be displayed in the neighborhood of the time bar. Thus, the document in the scene jump destination position can be confirmed and the user can find a desired scene jump destination position more surely. In addition, a portion of the document displayed on the small screen 16*a* is previously stored in the position table 45, the document portion can be displayed at very high speed.

Figure 10B:
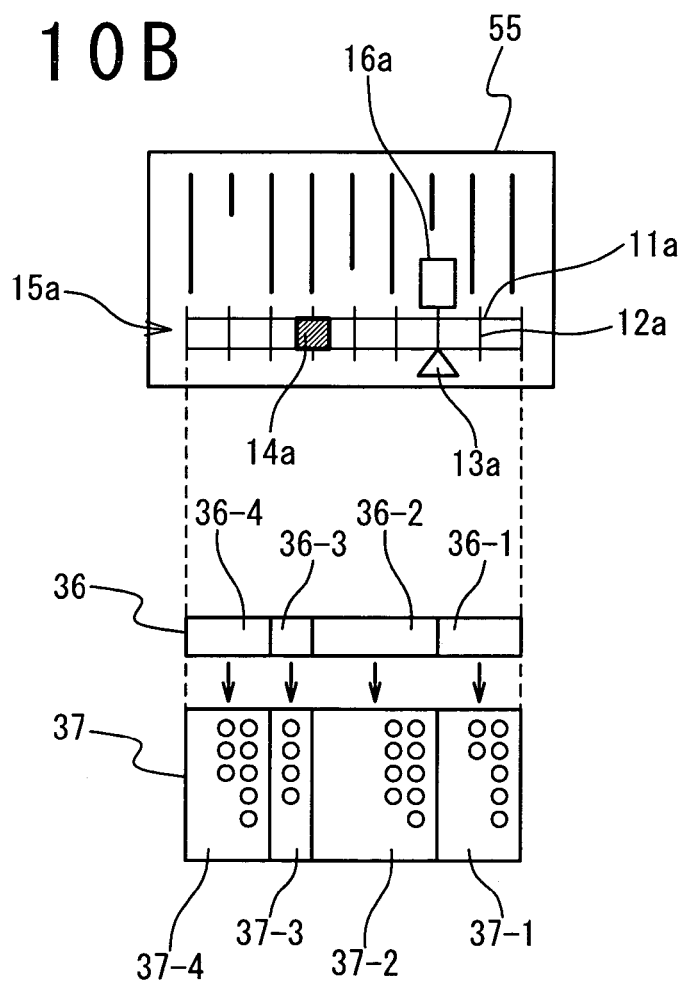
FIG. 10B is a diagram showing relation between the display screen of the same type as the document reader shown in FIG. 10A and another data.

As for the document reader, the following modification is possible. FIG. 10B is a diagram showing relation between the display screen 55 of the same type as the document reader shown in FIG. 10A and another data. The display screen 55 is the same as shown in FIG. 10A. However, in this example, an item of the contents in the jump destination, e.g., "chapter 1: introduction" is displayed on the small screen 16*a*. As shown in FIG. 10B, the whole content area 36 corresponds to the whole document, like the whole time bar 15*a*. The content area 36 is divided into a plurality of content sub-areas 36-1 to 36-4 in accordance with the items of the contents. In this example, the content area is divided into four. For example, the content sub-areas 36 are an area of 1 to 15 pages, an area of 16 to 30 pages, an area of 31 to 45 pages, and so on. The segments 12*a* are contained in either of the content sub-areas 36 (36-1 to 36-4). Item display data 37 (37-1 to 37-4) corresponds to the respective content sub-areas 36 (36-1 to 36-4). For example, the content display data 37 is text data such as "chapter 1: introduction, and chapter 2: main subject (1)". The items of the document contents are acquired from the content table 35 stored in the HDD or the memory and the content table 35 relates the content display data 37 shown in FIG. 14 and the content sub-areas 36. It should be noted that the number of content sub-areas 36 and the number of content display data 37 are never limited to the above-mentioned example.

Figure 14:
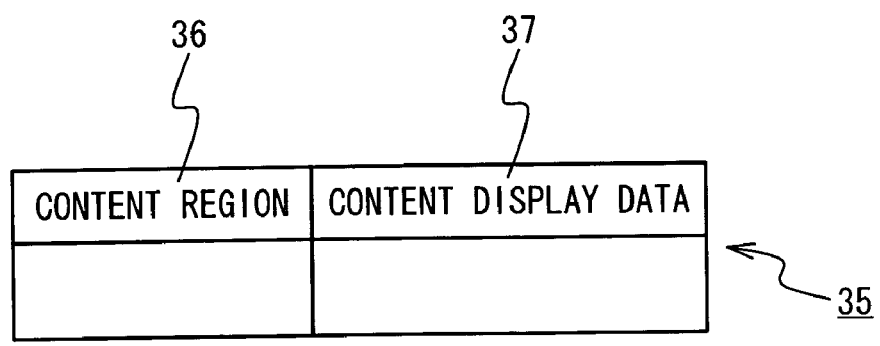
FIG. 14 is a diagram showing a content table.

In case of the step S1 of the above-mentioned operation, the document of the electronic data is scanned immediately before the document of the electronic data is replayed. The content table 35 shown in FIG. 14 is generated previously and stored it in the RAM 5. Then, at the step S13, first, the page corresponding to the position of the pointer icon 13 is calculated in accordance with the operation of the pointer icon 13. For example, the page is calculated based on the total number of pages and the selected one of the segments 12. Next, the content sub-area 36 containing the determined page is searched from the content table 35. Then, the content display data 37-1 corresponding to the content sub-area 36-1 is taken out. Then, the content display data 37-1 is outputted together with the time bar data. Thus, the small screen 16*a* can be displayed in the neighborhood of the time bar. The replaying section 22 displays the small screen 16*a* by shifting the small screen 16*a* so as for the letters not to be hidden behind the small screen 16*a*. Then, at the step S16, after the determining of the destination position, the replaying section 22 deletes the small screen and the time bar 15*a* from the screen. It is as previously mentioned that the deletion of the time bar 15*a* and the small screen 16*a* is carried out in accordance with the setting of the user. Because the operation is same as described above except for use of the content table 35, the description is omitted.

In the present invention, the small screen 16*a* can be displayed in the neighborhood of the time bar. Thus, the document in the scene jump destination position can be confirmed and the user can find a desired scene jump destination position more surely. In addition, the document displayed on the small screen 16*a* is previously stored in the content table 35 and the display on the small screen 16*a* can be carried out at very high speed.

Figure 11:
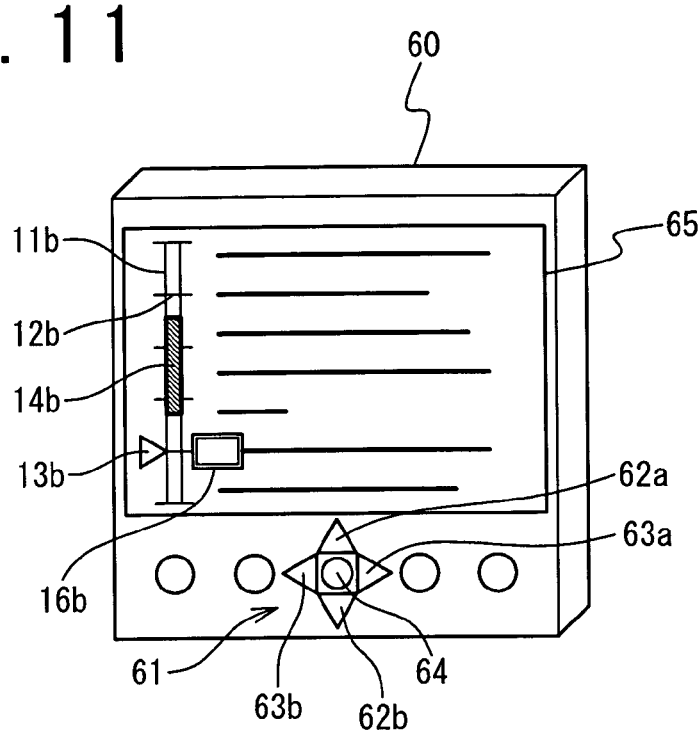
FIG. 11 is a diagram showing a document reader of a vertical scroll type with the time bar display.

FIG. 11 is a diagram showing the document reader of a vertical scroll type with a time bar. The document reader 60 is the same as the document reader 50 basically. However, the document reader 60 is different from the document reader 50 in the points that the scroll direction is different and that the functions of the upward and down direction keys are exchanged with the functions of the left and right direction keys.

The document reader 60 displays a time bar main section 11*b*, segments 12*b*, a pointer icon 13*b*, a replay position icon 14*b*, and a small screen 16*b* on a display screen 65. The operation of the document reader 60 is carried out by use of a cross button 61 (an up direction key 62*a*, a down direction key 62*b*, a right direction key 63*a*, and a left direction key 63*b*, and a determination key 64) on the document reader 60. A sentence in the jump destination position is displayed on the small screen 16*b*. Because the operation is same as described above except that the functions of the up direction key 62*a* and the down direction key 62*b* are exchanged by the functions of the right direction key 63*a* and the left direction key 63*b*, the description is omitted.

In this case, the same effect as the above embodiments can be achieved. In addition, in such a carrying information terminal, it is desired that the number of times of key operation is less and the operation is as simple as possible. By using the time bar of the present invention, the position in the document can be changed by a simple operation. For example, the operation is possible with one finger of the one hand.

Figure 12:
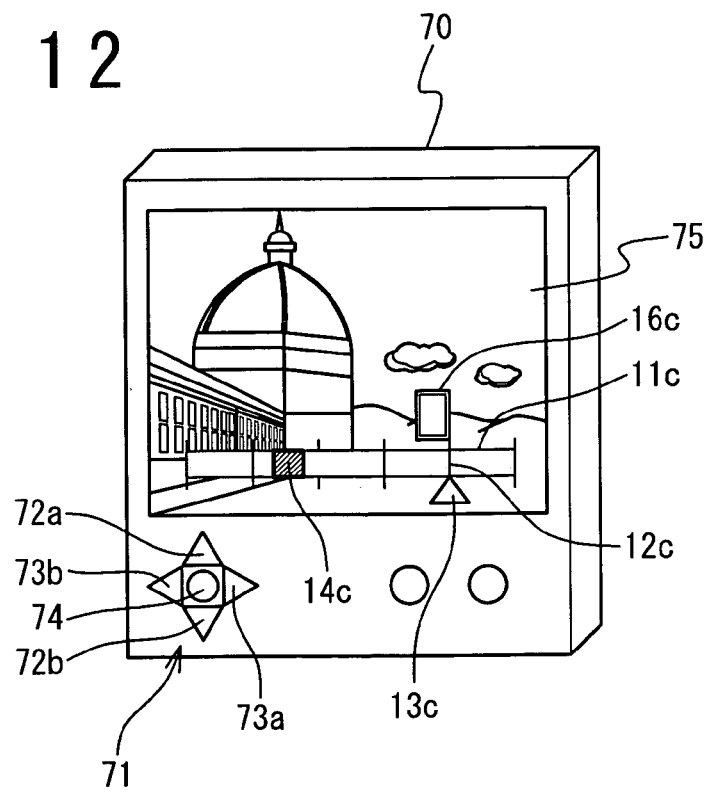
FIG. 12 is a still image display unit with the time bar display.

FIG. 12 is a still image display unit with a time bar. The still image display unit 70 carries out so-called slide show in which a plurality of still images of an electronic data are continuously displayed. The still image display unit 70 is an AV apparatus with a still image display function and a PDA. The still image display unit 70 displays a time bar main section 11*c*, segments 12*c*, a pointer icon 13*c*, a replay position icon 14*c*, a small screen 16*c* on a display screen 75. The operation of the still image display unit 70 is carried out by a cross button 71 (an up direction key 72*a*, a down direction key 72*b*, a right direction key 73*a*, a left direction key 73*b* and a determination key 74) on the still image display unit 70. A still image in a jump destination is displayed on the small screen 16*c*. The operation of the still image display unit 70 is same as those of the above-mentioned embodiments except that the number of images is used in place of the time data in the video data. Therefore, the description of the operation is omitted.

In the present invention, a replay start position can be instructed through a simple operation without decreasing the number of degrees of freedom in an instruction of the replay start position and the replay start point can be set in a short time.

What is claimed is:

1. A digital data replaying apparatus connected with a display unit, said apparatus comprising:
   an assisting section which generates a time bar data relating to a contents data in response to a time bar display instruction; and a replaying section which outputs said contents data and said time bar data to said display unit, wherein a time bar is displayed on said display unit based on said time bar data and comprises:

a main section showing a replay time of said contents data;

a current set of a plurality of segments provided to divide said time bar main section into a preset number;

a pointer icon which is displayed in association with one of said plurality of segments; and a replay position icon, separate from said pointer icon, configured to show a replay position of the contents data currently being replayed, wherein said assisting section moves said pointer icon in equidistance time intervals in association with said plurality of segments in response to a pointer movement instruction, wherein when one of said plurality of segment is selected as a selection segment, said replaying section outputs said contents data to said display unit from a portion of said contents data corresponding to said selection segment as a replay contents data portion, wherein said replay position icon and said pointer icon are always displayed in a same one of said segments, and wherein, when the time bar is displayed after said contents data is displayed on said display unit, said assisting section places the pointer icon on a position of one of said segments which is a nearest to said replay position icon.

2. The digital data replaying apparatus according to claim 1, wherein said assisting section generates a new time bar data in response to a segmentation change instruction such that a number of said segments is changed, and wherein said time bar is displayed on said display unit based on said new time bar data.

3. The digital data replaying apparatus according to claim 1, wherein said assisting section generates said time bar data in response to said time bar display instruction such that said time bar further contains another set of a plurality of segments, and wherein a number of said segments of said set is different from a number of segments of said another set.

4. The digital data replaying apparatus according to claim 1, wherein said assisting section generates said time bar data in response to said time bar display instruction such that a small screen is displayed on said display unit to display said replay contents data portion.

5. The digital data replaying apparatus according to claim 4, wherein said assisting section generates said time bar data such that said small screen is moved together with said pointer icon in response to said pointer movement instruction.

6. The digital data replaying apparatus according to claim 1, wherein said digital video contents data comprises an MPEG video data stored in a storage media, wherein said MPEG video data has a time data corresponding to each of a plurality of frames, wherein said digital data replaying apparatus further comprises a time table, which relates a system clock reference data contained in said MPEG video data as said time data and a storage position of said MPEG video data on said storage media, and wherein said assisting section refers to said time table based on said system clock reference data related to said selection segment to determine said storage position as a start position of said replay contents data portion.

7. The digital data replaying apparatus according to claim 4, wherein said digital video contents data comprises an MPEG video data stored in a storage media, wherein said MPEG video data has a time data corresponding to each of a plurality of frames, wherein said digital data replaying apparatus further comprises a time table, which relates a system clock reference data contained in said MPEG video data, a small screen display portion of said MPEG video data corresponding to said system clock reference data and a storage position of said MPEG video data on said storage media, and wherein said assisting section refers to said time table based on said system clock reference data related to said selection segment to determine said small screen display portion.

8. The digital data replaying apparatus according to claim 1, wherein said time bar display instruction and said pointer movement instruction are outputted from a remote control unit.

9. The digital data replaying apparatus according to claim 1, wherein said contents data contains a document data.

10. The digital data replaying apparatus according to claim 1, wherein said contents data contains a document data, wherein said digital data replaying apparatus further comprises a content table, which relates a content display data showing items of contents of said document data and related with each of said plurality of segments and a content area data showing a range of said document data corresponding to said content display data, wherein said assisting section refers to said content table based on said selection segment in response to said pointer movement instruction to determine said content area data, and wherein said replaying section outputs said document data corresponding to said determined content area data and said time bar data to said display unit.

11. The digital data replaying apparatus according to claim 1, wherein said contents data contains a plurality of continuous still video data.

12. A digital data replaying method in a digital data replaying apparatus connected with a display unit, said method comprising:

generating a time bar data relating to a contents data in response to a time bar display instruction; and displaying said time bar data and said contents data on said display unit from a start of said contents data, wherein a time bar is displayed on said display unit based on said time bar data and comprises:

a main section showing a replay time of said contents data;

a current set of a plurality of segments provided to divide said time bar main section into a preset number;

a pointer icon which is displayed in association with one of said plurality of segments, said pointer icon being moved in equidistance time intervals in association with said plurality of segments in response to a pointer movement instruction; and a replay position icon, separate from said pointer icon, configured to show a replay position of the contents data currently being replayed, wherein, in said displaying, when one of said plurality of segment is selected as a selection segment, displaying said contents data on said display unit from a portion of said contents data corresponding to said selection segment as a replay contents data portion, wherein said replay position icon and said pointer icon are always displayed in a same one of said segments, and wherein, when the time bar is displayed after said contents data is displayed on said display unit, the pointer icon is placed on a position of one of said segments which is a nearest to said replay position icon.

13. The digital data replaying method according to claim 12, further comprising:

generating a new time bar data in response to a segmentation change instruction such that a number of said segments is changed, and displaying said new time bar data on said display unit.

14. The digital data replaying method according to claim 12, wherein said generating a time bar data comprises:

generating said time bar data in response to said time bar display instruction such that said time bar further contains another set of a plurality of segments, wherein a number of said segments of said set is different from a number of segments of said another set.

15. The digital data replaying method according to claim 12, wherein said generating a time bar data comprises:

generating said time bar data in response to said time bar display instruction such that a small screen is displayed on said display unit to display said replay contents data portion.

16. The digital data replaying method according to claim 15, further comprising:

generating said time bar data such that said small screen is moved when said pointer icon is moved in response to said pointer movement instruction.

17. The digital data replaying method according to claim 12, wherein said digital video contents data is an MPEG video data stored in a storage media, and wherein said MPEG video data has a time data corresponding to each of a plurality of frames, wherein said displaying comprises:

referring to a time table based on a system clock reference data related to said selection segment to determine a storage position as a start position of said replay contents data portion, wherein said time table relates said system clock reference data contained in said MPEG video data as said time data and said storage position of said MPEG video data on said storage media.

18. The digital data replaying method according to claim 15, wherein said digital video contents data comprises an MPEG video data stored in a storage media, and wherein said MPEG video data has a time data corresponding to each of a plurality of frames, wherein said displaying comprises:

referring to a time table based on a system clock reference data related to said selection segment to determine a small screen display portion, said time table relates said system clock reference data contained in said MPEG video data, said small screen display portion of said MPEG video data corresponding to said system clock reference data and said storage position of said MPEG video data on said storage media.

19. The digital data replaying method according to claim 12, wherein said time bar display instruction and said pointer movement instruction are outputted from a remote control unit.

20. The digital data replaying method according to claim 12, wherein said contents data contains a document data.

21. The digital data replaying method according to claim 12, wherein said contents data contains a document data, said displaying comprises:

referring to a content table based on said selection segment in response to said pointer movement instruction to determine a content area data, wherein said content table relates said content display data showing items of contents of said document data and related with each of said plurality of segments and said content area data showing a range of said document data corresponding to said content display data.

22. The digital data replaying method according to claim 12, wherein said contents data contains a plurality of continuous still video data.

23. A computer-readable storage medium encoded with a program executed by a computer for achieving a digital data replaying method in a digital data replaying apparatus connected with a display unit, said digital data replaying method comprises:

generating a time bar data relating to a contents data in response to a time bar display instruction; and displaying said time bar data and said contents data on said display unit from a start of said contents data, wherein a time bar is displayed on said display unit based on said time bar data and comprises:

a main section showing a replay time of said contents data;

a current set of a plurality of segments provided to divide said time bar main section into a preset number;

a pointer icon which is displayed in association with one of said plurality of segments, said pointer icon moving in equidistance time intervals in association with said plurality of segments in response to a pointer movement instruction; and a replay position icon, separate from said pointer icon, configured to show a replay position of the contents data currently being replayed, and wherein, in said displaying, when one of said plurality of segment is selected as a selection segment, displaying said contents data on said display unit from a portion of said contents data corresponding to said selection segment as a replay contents data portion, wherein said replay position icon and said pointer icon are always displayed in a same one of said segments, and wherein, when the time bar is displayed after said contents data is displayed on said display unit, the pointer icon is placed on a position of one of said segments which is a nearest to said replay position icon.

24. The computer-readable storage medium according to claim 23, wherein said digital data replaying method further comprises:

generating a new time bar data in response to a segmentation change instruction such that a number of said segments is changed, and displaying said new time bar data on said display unit.

25. The computer-readable storage medium according to claim 23, wherein said generating a time bar data comprises:

generating said time bar data in response to said time bar display instruction such that a small screen is displayed on said display unit to display said replay contents data portion.

26. The computer-readable storage medium according to claim 23, wherein said digital video contents data comprises an MPEG video data stored in a storage media, and wherein said MPEG video data has a time data corresponding to each of a plurality of frames, wherein said displaying comprises:

referring to a time table based on a system clock reference data related to said selection segment to determine a storage position as a start position of said replay contents data portion,
wherein said time table relates said system clock reference data contained in said MPEG video data as said time data and said storage position of said MPEG video data on said storage media.

27. The computer-readable medium according to claim 23 wherein said contents data contains a document data,
 wherein said displaying comprises:
  referring to a content table based on said selection segment in response to said pointer movement instruction to determine a content area data,
 wherein said content table relates said content display data showing items of contents of said document data and related with each of said plurality of segments and said content area data showing a range of said document data corresponding to said content display data.

28. The computer-readable storage medium according to claim 23, wherein said contents data contains a plurality of continuous still video data.

29. The digital data replaying apparatus according to claim 2, wherein both the time bar data and the new time bar data are related to the contents data.

30. The digital data replaying apparatus according to claim 3, wherein both the current set of the plurality of segments and the another set of a plurality of segments are related to the contents data.

\* \* \* \* \*